(12) United States Patent
Harris

(10) Patent No.: US 8,141,783 B2
(45) Date of Patent: *Mar. 27, 2012

(54) BARCODE DEVICE

(76) Inventor: Scott C. Harris, Rancho Santa Fe, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/083,558

(22) Filed: Apr. 9, 2011

(65) Prior Publication Data

US 2011/0180597 A1    Jul. 28, 2011

Related U.S. Application Data

(60) Continuation of application No. 12/103,815, filed on Apr. 16, 2008, now Pat. No. 7,963,446, which is a division of application No. 10/714,097, filed on Nov. 14, 2003, now Pat. No. 7,967,207, which is a division of application No. 09/618,988, filed on Jul. 18, 2000, now Pat. No. 6,666,377.

(51) Int. Cl.
*G06K 7/10* (2006.01)
*G06K 7/14* (2006.01)
*G06K 15/00* (2006.01)
*G06K 5/04* (2006.01)
*G06K 7/00* (2006.01)
*G06K 19/00* (2006.01)

(52) U.S. Cl. ......... 235/462.01; 235/462.13; 235/462.08; 235/380; 235/435; 235/454; 235/487

(58) Field of Classification Search ............. 235/462.13, 235/462.08, 380, 435, 454, 487
See application file for complete search history.

(56) References Cited

U.S. PATENT DOCUMENTS

| | | |
|---|---|---|
| 4,476,381 A | 10/1984 | Rubin |
| 4,896,029 A | 1/1990 | Chandler |
| 4,973,830 A | 11/1990 | Ouchi |
| 5,176,224 A | 1/1993 | Spector |
| 5,276,315 A | 1/1994 | Surka |
| 5,298,731 A | 3/1994 | Ett |
| 5,329,105 A | 7/1994 | Klancnik |
| 5,337,361 A | 8/1994 | Wang |
| 5,352,878 A | 10/1994 | Smith |
| 5,361,871 A | 11/1994 | Gupta |
| 5,368,129 A | 11/1994 | Von Kohorn |
| 5,477,042 A | 12/1995 | Wang |
| 5,576,528 A | 11/1996 | Chew et al. |

(Continued)

FOREIGN PATENT DOCUMENTS

JP    55102083    8/1980

(Continued)

OTHER PUBLICATIONS

Various Court filings for *Bartex Research, LLC*, v. *Fedex Corporation, Fedex Express Corporation, Fedex Ground Package System, Inc., and Fedex Kinko'S Office and Print Services, Inc.* Civil Action No. 6:07-cv-00385 LED, Eastern District of Texas, Tyler Division.

(Continued)

*Primary Examiner* — Daniel Walsh
(74) *Attorney, Agent, or Firm* — Law Office of Scott C. Harris, Inc.

(57) ABSTRACT

Bar codes used for various applications. A bar code can be used for biometrics, or for computer data entry. A special bar code is described that has additional information, but can be read by other readers.

14 Claims, 4 Drawing Sheets

FROM: S@COM0.COM
TO: X@COM0.COM

SUBJECT: BARCODE MEETING

BARCODE MEETING, TOMMOROW AT 5

500

U.S. PATENT DOCUMENTS

| | | | |
|---|---|---|---|
| 5,585,616 A | 12/1996 | Roxby | |
| 5,590,038 A | 12/1996 | Pitroda | |
| 5,663,552 A | 9/1997 | Komizo | |
| 5,710,417 A | 1/1998 | Joseph | |
| 5,767,496 A | 6/1998 | Swartz | |
| 5,773,806 A | 6/1998 | Longacre | |
| 5,789,732 A * | 8/1998 | McMahon et al. | 235/487 |
| 5,805,152 A * | 9/1998 | Furusawa | 715/205 |
| 5,805,740 A | 9/1998 | Takagi | |
| 5,869,828 A | 2/1999 | Braginsky | |
| 5,913,542 A | 6/1999 | Belucci | |
| 5,914,476 A | 6/1999 | Gerst | |
| 5,914,477 A | 6/1999 | Wang | |
| 5,920,062 A | 7/1999 | Williams | |
| 5,938,727 A * | 8/1999 | Ikeda | 709/218 |
| 5,949,879 A | 9/1999 | Berson | |
| 5,991,749 A | 11/1999 | Morrill, Jr. | |
| 6,012,102 A * | 1/2000 | Shachar | 710/5 |
| 6,032,861 A | 3/2000 | Lemelson | |
| 6,032,863 A | 3/2000 | Nethery | |
| 6,070,805 A | 6/2000 | Kaufman | |
| 6,082,621 A | 7/2000 | Chan | |
| 6,095,418 A | 8/2000 | Swartz | |
| 6,102,289 A | 8/2000 | Gabrielson | |
| 6,137,950 A * | 10/2000 | Yuen | 386/314 |
| 6,223,166 B1 * | 4/2001 | Kay | 705/5 |
| 6,270,724 B1 | 8/2001 | Woodaman | |
| 6,321,986 B1 | 11/2001 | Ackley | |
| 6,354,503 B1 | 3/2002 | Chiu | |
| 6,398,117 B1 | 6/2002 | Oakeson | |
| 6,434,403 B1 * | 8/2002 | Ausems et al. | 455/556.2 |
| 6,446,871 B1 | 9/2002 | Buckley | |
| 6,454,174 B1 * | 9/2002 | Sansone | 235/494 |
| 6,457,651 B2 | 10/2002 | Paul | |
| 6,466,951 B1 * | 10/2002 | Birkler et al. | 1/1 |
| 6,478,223 B1 | 11/2002 | Ackley | |
| 6,479,016 B1 | 11/2002 | Goldsmith | |
| 6,536,670 B1 | 3/2003 | Postman | |
| 6,550,672 B1 | 4/2003 | Tracy | |
| 6,622,917 B1 | 9/2003 | Knowles | |
| 6,631,843 B2 | 10/2003 | Schuessler | |
| 6,672,511 B1 | 1/2004 | Shellhammer | |
| 6,688,523 B1 | 2/2004 | Koenck | |
| 6,711,617 B1 * | 3/2004 | Bantz et al. | 709/227 |
| 6,736,322 B2 * | 5/2004 | Gobburu et al. | 235/462.46 |
| 6,801,907 B1 | 10/2004 | Zagami | |
| 6,827,273 B2 | 12/2004 | Wilz | |
| 7,118,040 B2 * | 10/2006 | Melick et al. | 235/462.01 |
| 7,150,400 B2 | 12/2006 | Melick et al. | |
| 7,156,306 B1 | 1/2007 | Kenney | |
| 7,207,481 B2 | 4/2007 | Barenburg | |
| 7,209,903 B1 * | 4/2007 | Mamdani et al. | 705/75 |
| 7,225,260 B2 | 5/2007 | Herrod | |
| 7,353,996 B2 | 4/2008 | Goodman et al. | |
| 7,377,426 B1 * | 5/2008 | Makeever | 235/382 |
| 7,578,443 B1 * | 8/2009 | Harris | 235/462.01 |
| 7,949,669 B2 * | 5/2011 | Tischer | 707/758 |
| 2001/0006191 A1 | 7/2001 | Hecht | |
| 2001/0041560 A1 * | 11/2001 | Tarkiainen et al. | 455/414 |
| 2001/0045461 A1 | 11/2001 | Schuessler | |
| 2002/0004746 A1 * | 1/2002 | Ferber et al. | 705/14 |
| 2002/0020747 A1 | 2/2002 | Wakamiya | |
| 2002/0023027 A1 * | 2/2002 | Simonds | 705/26 |
| 2002/0047867 A1 | 4/2002 | Mault | |
| 2002/0050526 A1 | 5/2002 | Swartz | |
| 2002/0060246 A1 | 5/2002 | Gobburu et al. | |
| 2002/0065728 A1 | 5/2002 | Ogasawara | |
| 2002/0070275 A1 * | 6/2002 | Mullins et al. | 235/462.01 |
| 2002/0070278 A1 * | 6/2002 | Hung et al. | 235/472.01 |
| 2002/0071076 A1 | 6/2002 | Webb et al. | |
| 2002/0074403 A1 | 6/2002 | Krichever | |
| 2002/0084330 A1 | 7/2002 | Chiu | |
| 2002/0088865 A1 | 7/2002 | He | |
| 2002/0102966 A1 | 8/2002 | Lev | |
| 2002/0138771 A1 * | 9/2002 | Dutta | 713/202 |
| 2002/0160761 A1 | 10/2002 | Wolfe | |
| 2002/0186884 A1 | 12/2002 | Shaked | |
| 2002/0195495 A1 * | 12/2002 | Melick et al. | 235/462.01 |
| 2003/0024988 A1 * | 2/2003 | Stanard | 235/462.01 |
| 2003/0030834 A1 * | 2/2003 | Parry | 358/1.14 |
| 2003/0047613 A1 | 3/2003 | Funamoto et al. | |
| 2003/0050033 A1 | 3/2003 | Kawaguchi | |
| 2003/0050818 A1 * | 3/2003 | Maie et al. | 705/8 |
| 2003/0057276 A1 * | 3/2003 | Appalucci et al. | 235/382 |
| 2003/0057284 A1 | 3/2003 | Challa et al. | |
| 2003/0066883 A1 * | 4/2003 | Yu | 235/382 |
| 2004/0069855 A1 | 4/2004 | Patel | |
| 2004/0153969 A1 * | 8/2004 | Rhodes | 715/515 |
| 2004/0193497 A1 * | 9/2004 | Tanaka | 705/16 |
| 2004/0229677 A1 | 11/2004 | Gray et al. | |
| 2004/0246529 A1 | 12/2004 | Pruden | |
| 2005/0008261 A1 * | 1/2005 | Wolff et al. | 382/305 |
| 2005/0040230 A1 | 2/2005 | Swartz | |
| 2005/0083413 A1 | 4/2005 | Reed | |
| 2005/0099653 A1 | 5/2005 | Kawaoka | |
| 2005/0174258 A1 | 8/2005 | Yamanouchi et al. | |
| 2005/0198095 A1 | 9/2005 | Du | |
| 2005/0199724 A1 | 9/2005 | Lubow | |
| 2005/0246237 A1 * | 11/2005 | Hudetz et al. | 705/26 |
| 2005/0273186 A1 | 12/2005 | Morris | |
| 2005/0274788 A1 | 12/2005 | Craig | |
| 2005/0288987 A1 * | 12/2005 | Sattler et al. | 705/9 |
| 2006/0006231 A1 | 1/2006 | Anson | |
| 2006/0006238 A1 | 1/2006 | Singh | |
| 2006/0053050 A1 | 3/2006 | Schweier | |
| 2006/0054695 A1 * | 3/2006 | Owada | 235/440 |
| 2006/0097041 A1 | 5/2006 | Funamoto et al. | |
| 2006/0108422 A1 | 5/2006 | Melick et al. | |
| 2006/0118631 A1 | 6/2006 | Lubow | |
| 2006/0213969 A1 | 9/2006 | Russell | |
| 2006/0231635 A1 | 10/2006 | Kim | |
| 2006/0255150 A1 | 11/2006 | Longacre | |
| 2006/0278709 A1 | 12/2006 | Longacre | |
| 2007/0012779 A1 | 1/2007 | Melick et al. | |
| 2007/0045421 A1 | 3/2007 | Liu | |
| 2007/0097199 A1 * | 5/2007 | Schmitt et al. | 347/107 |
| 2007/0228169 A1 | 10/2007 | Kenney | |
| 2007/0241189 A1 | 10/2007 | Slavin et al. | |
| 2007/0246538 A1 * | 10/2007 | Melick et al. | 235/462.01 |
| 2008/0191025 A1 * | 8/2008 | Harris | 235/462.41 |
| 2009/0108056 A1 * | 4/2009 | Faust et al. | 235/375 |
| 2009/0222459 A1 * | 9/2009 | Steinberg | 707/10 |
| 2009/0276717 A1 * | 11/2009 | Oswalt | 715/744 |
| 2011/0180597 A1 * | 7/2011 | Harris | 235/375 |

FOREIGN PATENT DOCUMENTS

| | | |
|---|---|---|
| JP | 61217887 | 9/1986 |
| JP | 3192523 | 8/1991 |
| JP | 07244652 | 9/1995 |
| JP | 10309860 A | 11/1998 |

OTHER PUBLICATIONS

Database Disclosure, undated.
Markman Construction, Apr. 22, 2009.
Stages of Developments of International Standards, Jun. 10, 2009.
How ISO develops standards, Jun. 1, 2009.
ISO TC 122, Jun. 1, 2009.
Declaration of Scott Harris, from *Illinois Computer Research, LLC* v *Fish & Richardson, PC*.
File of Reexamination control No. 95/000,423.
www.iidautomation.com/ccdreaders.
www.hallogram.com/barcodes/others.html.
Exhibit A, Judgment, Appeal from the United States District Court for the Eastern District of Texas in Case No. 07-CV-0385, Feb. 22, 2011, pp. 1-3.
Reexam. Control No. 95/000,423, Update on Concurrent Litigation Under 37 CFR 1.985(b), Mar. 1, 2010, pp. 1-3.
"A white Paper on Two Dimensional Symbols", CSPI 1996.
"QED systems in review" Aug. 1999.
RPS Multicode Bar Code Label Guide, Undated.
Getting Great Mileage from Automatic Data Collection, Material Handling Engineering (May 1995).
ANSI MH10.8.3M-1996.
RPS's Multicode(SM) Gives Shippers More Information Options; Symbol Technologies LS 4800 Scanners Will Transform RPS into 'Data Warehouse,' Business Wire (Oct. 18, 1995).

"Reading Between the Lines" by Craig Harmon, 1997.

"UPS Guide to Barcoding", undated.

P. Mathans, B. Stamp, and C. Harmon, A White Paper on Two Dimensional Symbols: Because you need information on the fly and on the spot, Vision Systems (1996).

"Guide to Bar Coding with UPS . . . " undated.

"Packaging—Bar code and tw0-dimensional symbols for shipping, transport and receiving labels", ISO 15394, 2000.

Automatic Data Capture (ADC) 2D Code applications at Siemens AG, Nov. 1998.

Symbol Technologies PDF417 Selected by Defense Department as 2D Symbology for Global ID card, Nov. 1994.

Warehouse Management Systems: Configurability for Optimization, Oct. 1996.

AIM—ITS/99-003, Oct. 1999.

AIM—ITS/99-002, Oct. 1999.

Codes Don't Sweat the Small Stuff, Oct. 1998.

The Portable Database Debate, Nov. 1990.

Order of Invalidity in parent application 6666377.

\* cited by examiner

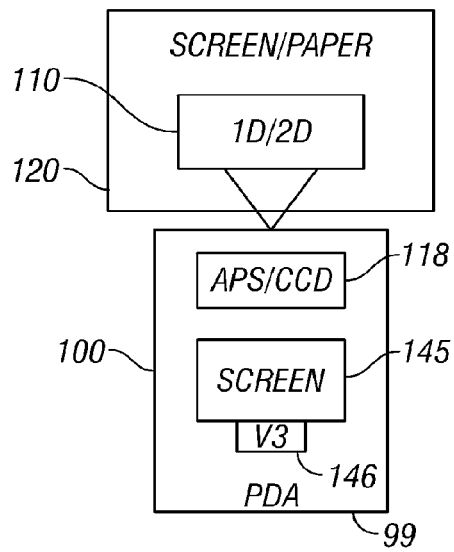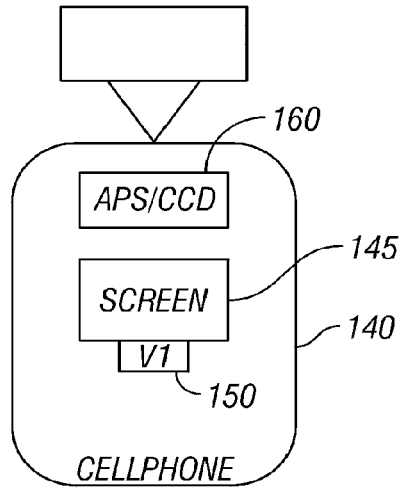
FIG. 1A
FIG. 1B
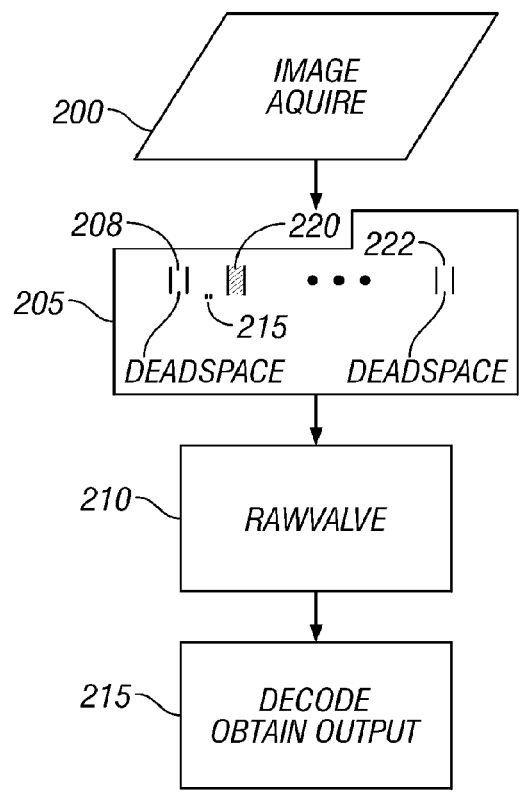
FIG. 2

BARCODE DEVICE

This application is a Continuation of Ser. No. 09/930,506 filed Oct. 31, 2007, now U.S. Pat. No. 7,756,378, which is a continuation of Ser. No. 10/714,097 filed Nov. 14, 2003, which is a Division of Ser. No. 09/618,988 filed Jul. 18, 2000, now U.S. Pat. No. 6,666,377

BACKGROUND

The present application relates to bar codes, and to scanning of bar codes and other scannable type codes to obtain and enter information.

Bar codes are often used in scanning of information. A bar code provides information based on sizes of its different parts.

Typical linear/one-dimensional bar codes provide white and dark bars forming a bar code image. Linear bar codes may include Universal Product Codes (UPCs), Type 39 bar codes and type 128 bar codes. Two-dimensional bar codes, including a "matrix" code and the "Gettysburg Address" type bar code, are also known. Bar codes have been used for many purposes including inventory control.

SUMMARY

The present application teaches using scanned information from a scannable code to enter special kinds of information. One embodiment describes using the scannable code in place of a photo. Another embodiment describes bar codes being sent as part of a message, where the message can be an advertisement, an email, or the like. The information in the bar code relates to some aspect of the message. For example, one embodiment describes using the bar code to represent a meeting time that is described in an email. Another embodiment describes using the bar code to represent a time and place of a function being advertised, e.g. an event. The bar codes can represent the information itself, or can represent an address from a look up database which includes more information about the bar code.

Another embodiment describes special kinds of bar codes which store additional information in a different way than previously carried out. One of these information types is a progressive information type where the bar code can be read by either a linear or a two-dimensional bar code scanner.

BRIEF DESCRIPTION OF THE DRAWINGS

These and other aspects will now be described in detail with respect to the accompanying drawings, wherein:

FIGS. 1A and 1B show an image used in a cellular telephone and/or a portable computer;

FIG. 2 shows a flowchart of operation of the sensor;

DETAILED DESCRIPTION

Figure 3:
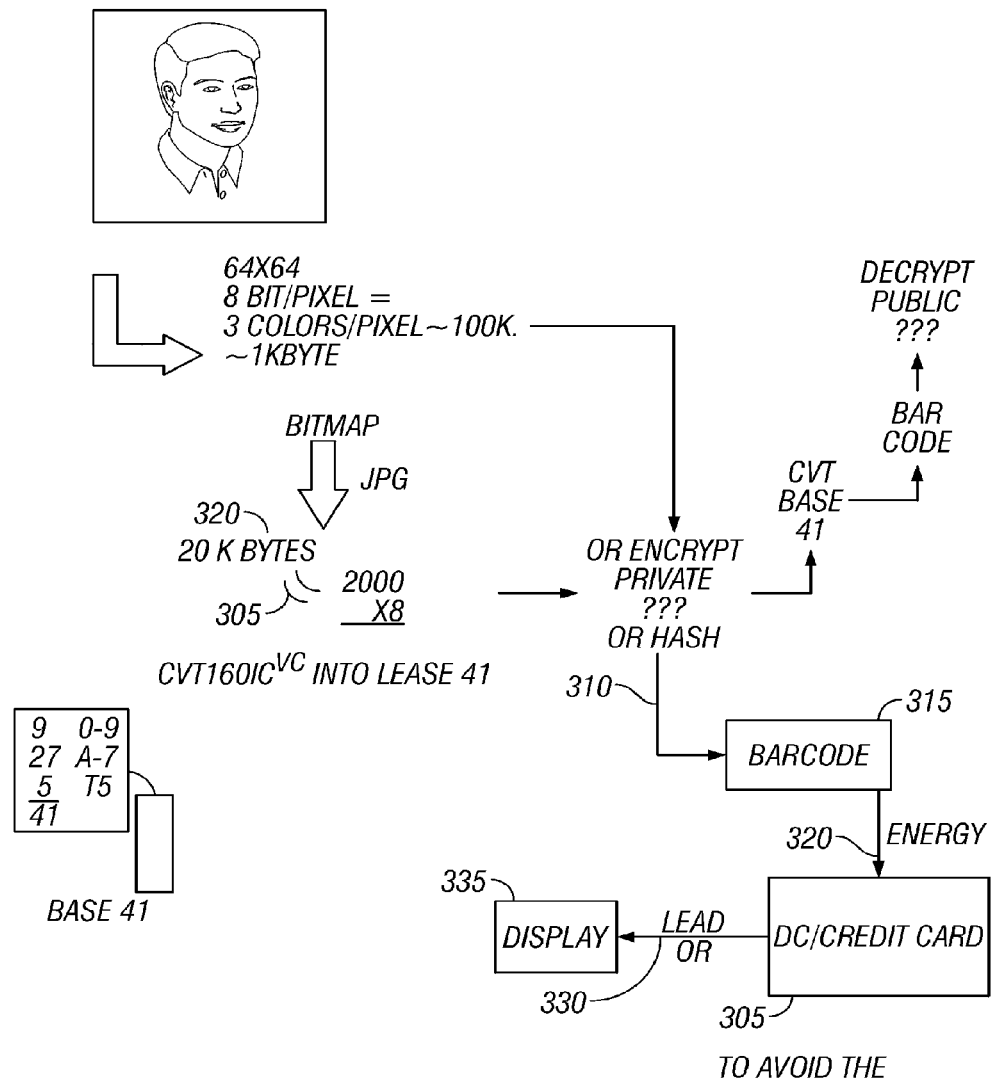
FIG. 3 shows a diagram of encoding of a photo.

The present application teaches using a symbolical code, such as a bar code, to enter information into a computer device. The computer device can be a portable computer which is described herein as being any computer in which the display and user interface are within the same housing, or a personal digital assistant which is a smaller version of the personal computer, which again has data entry parts and display within a single housing, but has outer perimeters which are sized to fit any user's hand, e.g. less than ten inches by ten inches. Another embodiment describes a special kind of PDA which includes a portable telephone such as a cellular telephone, included therein.

The bar codes can be imaged/scanned in a number of different ways. One embodiment discloses using a camera to input and decode these bar codes. The embodiments are shown in FIGS. 1A and 1B. FIG. 1A describes using a personal digital assistant 100 as the input device. One preferred input device of this type is the Palm V™. type hand held computer. A bar code scanner can be used, such as the commercially available Symbol Technology SPT 1700. Alternatively, a camera add-on unit can be added to the Palm V and used as described herein. The PDA includes a screen 145 and user interface 146 all within the same housing 99.

FIG. 1B shows the client being a cellular telephone which also may include a screen 145 and user interface 150. The cellular telephone can be associated with either a dedicated bar code scanner or an image sensor 160 of the type used to obtain photographs for video telephony.

In both devices, the input device obtains either a scan of the bar code, or an image of the bar code on a medium. The medium can be a display screen such as a computer display screen, or can be a sheet of paper. The information in the bar code is entered into the computer.

If a dedicated bar code scanner is used, then the value of the bar code is automatically output from the scanner by the operating system associated with the bar code scanner. FIG. 2 shows the flowchart which is used to obtain scanning information from a camera.

First the scan of the barcode image is acquired at 200. This image may be a pixel based bitmap.

Each bar code has certain rules constraining how the bar code is recognized. In two-dimensional bar codes, the spacing/pitch/size of and between the black and white bars often represent the information. Certain rules constrain what is a legal bar code. One such rule is the dead space rules, which defines legal characteristics of the edges of the bar code. The following description defines using the dead space rules, however, it should be understood that other constraining rules could alternately be used.

The bitmap is processed at 205 to look for dead space 208 in the bar code. The amount of spacing, which represents sizes of white and black parts, is then determined. The number of pixels which will represent each part can be ascertained. The image is then processed to find the number of white or black spaces 215, the next number of white or black spaces 220, and continuing until the ending dead space 222. Each blank space can be defined as being a certain number of pixels in the image sensor 118.

Image straightening algorithms can be used to rotate the image and straighten it in order to avoid improper values.

Then, these raw values at 210 that are indicative of the content of the bar code can be decoded by a conventional bar code decoding technique at 215. This system describes using an alphanumeric bar code such as the type 39 or type 128 bar code. 215 shows decoding these raw values to obtain the output representing the content of the bar code.

In this way, the image sensor which can be used for video output in a portable telephone, or for obtaining for digital pictures in a PDA, can become a bar code scanner. This system also facilitates using the special kinds of bar codes which are described herein with reference to the additional embodiments.

First Embodiment

Personal Identification

Personal cards such as driver license's and credit cards may include a user's personal identifying information. Signatures are conventionally used, but can be imitated by a clever forger. Photographs can also be used. However, a forger may slice out the photograph and replace it with a duplicate in order to spoof the system. The present application defines printing a bar code on the personal identification card. The bar code can be encrypted, and can include additional personal identifying information.

U.S. Pat. No. 5,420,924 describes putting a bar code on a personal identification card. However, this system recognized that not enough information can be stored. Therefore, this system took a slice of the overall image.

The information which is stored using this technique can include any personal identifying information, including a picture of the user's face, fingerprint information, dynamic information about the user's signature, i.e. the way that the user actually makes the signature. This can include the speed of signing, the technique of holding the pen, and the like. These latter features are more difficult for a forger to copy. This information is stored as data (e.g. dv/dt of the pen, time, angles, etc.) and stored in the bar code. If an image is used, the image should be of reduced resolution e.g. 20 by 20 pixels. Fingerprints can be stored as vectorized images of the fingerprint (e.g. using Adobe Streamline) or the like. The information is also preferably encrypted using a one way code e.g. such as public key cryptography. All of the public, that is every decoding station, is given the decoding key. Only authorized coders, such as the issuers of the cards are given the encoding key. An unauthorized user cannot make an authorized item of information in this way.

Each item of information can be tested using a hash function. Only information from the authorized user will pass the hash function.

The system described herein uses a type 39 bar code. A typical type 39 bar code has an unlimited number of total digits. Each digit can represent any of 0 through 9, A through Z or any of five punctuation characters. According to the present system, it is recognized that this combination provides the possibility of 41 different values for each digit.

FIG. 3 also shows the encoding operation. The bytes representing the code, shown as 320, are converted into a base N number at 305, where N is preferably the highest base that can be represented by all of the digits of the bar code or at least 80% of the digits. Here, a base 41 number is used. The digits zero through 9 represent their own value zero through 9, A through Z represent 10.sub.41 through 37.sub.41, and the punctuation characters represent, respectfully, 38.sub.41 through 41.sub.41. This same scheme can be used for any base of numbers.

At 310, the file representative of the personal information is converted to base 41. This is then encoded as a type 39 bar code at 315. The value is then encrypted at 320 using a one way function, and stored on the credit card at 325. Since the type 39 bar code has no limit on length, any amount of information can be stored in this way.

The bar code is read out and reconverted back to the original number at 330 and is used to drive a display device shown as 335 to display the characteristics. In the case of dynamic signature information or other such information, the stored characteristics may be directly compared against the sample instead of being displayed.

Alternatively, the information can represent a pointer to a database, e.g. a publicly available database. This database can later be accessed as part of an information transfer.

In this system, the information can represent an address, e.g. a number that is associated with a special function. The address is used to access a publicly available information network, e.g. by direct connection or by the Internet. As an example, the bar code may store an address command AD, followed by a base 39 alphanumeric value 4DMKDP. The bar code is scanned to obtain the command to obtain the image from address 4DMKDP. The value 4DMKDP may be converted to hex or binary prior to the request.

The database returns the image of the person.

Figure 4:
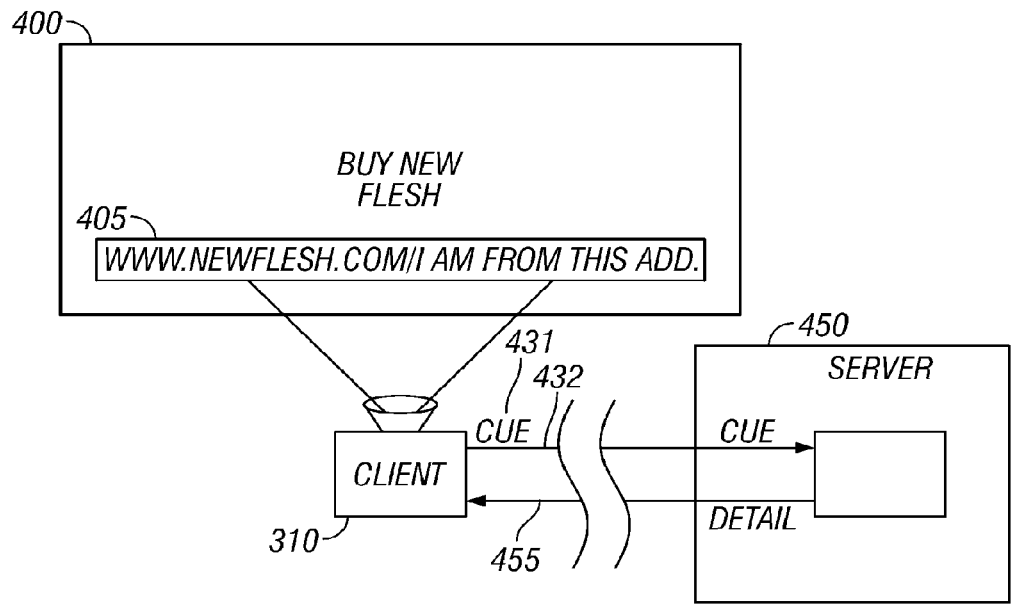
FIG. 4 shows a message with an associated bar code entry part.

Another embodiment shown in FIG. 4 uses bar codes to enter information into the computer. The FIG. 4 embodiment stores scannable non-alphanumeric information, e.g. bar code information, as some part of a communication—here an advertisement. The advertisement can be a print advertisement, a television advertisement, or an Internet advertisement for example. The advertisement 400 includes a bar code 405 therein. The bar code 405 is associated with the advertisement, and includes some additional information about the advertisement. For example, the bar code may include the web site address of the company preparing the advertisement, or appointment information about the advertisement, or a "vcf file" or the like which is an importable file with address information about the company or author sponsoring the advertisement.

In operation, the user brings one of the clients, either the cellular telephone 310 or PDA 315, into range of the bar code 405. The client reads the bar code and decodes it as noted above. The decoded information can represent ASCII information, a compressed file such as a zip file, G code information, or any other compressed or non-compressed information. The contents are automatically input into the client. The contents can directly represent that information, in which case the information is input into the client. For example, the information can directly represent the ASCII information indicating the website. Alternatively, the information can represent a pointer to a database, e.g. a publicly available database. This database can later be accessed as part of an information transfer.

For example, Palm systems enable a hot sync where the portable computer is synced with another computer that is running hot sync software.

In this system, the information can represent a cue, e.g. a number, that is associated with a special function. The cue is used during a hot sync to access a publicly available information network, e.g. by direct connection or by the Internet. The cue 431 is sent over the Internet 432 to the server 450, and addresses more detailed information in a memory of the server. The server returns that information as 455, and the client receives the more detailed information.

As an example, the bar code may store an cue command CX, followed by a base 39 alphanumeric value 4DMKDP. The bar code is scanned to obtain the command to cue to value 4DMKDP during the next hot sync. The value 4DMKDP may be converted to hex or binary prior to the hot sync.

During hot sync, the database returns the full text of the detailed information, e.g., "visit the website at http://www.p-dascan.com/.about.more to get a free gift." Any desired length or size of information can be returned.

As described above, therefore, this system enables the information in the bar code to be used as an address for look up address from a database. The database can be accessible over the Internet. During a later hot sync, this information can be translated into more detailed information which can be returned from the hot sync.

This information can be a hyperlink. The hyperlink can also use the techniques disclosed in co-pending application No. 60/161,700, entitled Internet Browsing From A Television, in which the origin of the hyperlink is included within the hyperlink itself. In this embodiment, a hyperlink may be stored for later visitation. The hyperlink also include a code therein which indicate the source from which the hyperlink originated. For example, the source may indicate the name of the print magazine, or the web page from which the hyperlink originated, or the like. In this way, the advertisement service can keep track of which advertising forms produce the best results. In addition, this facilitates a paradigm whereby the advertiser pays an advertising fee which is based on the number of website visits from the advertisement.

Figure 5:
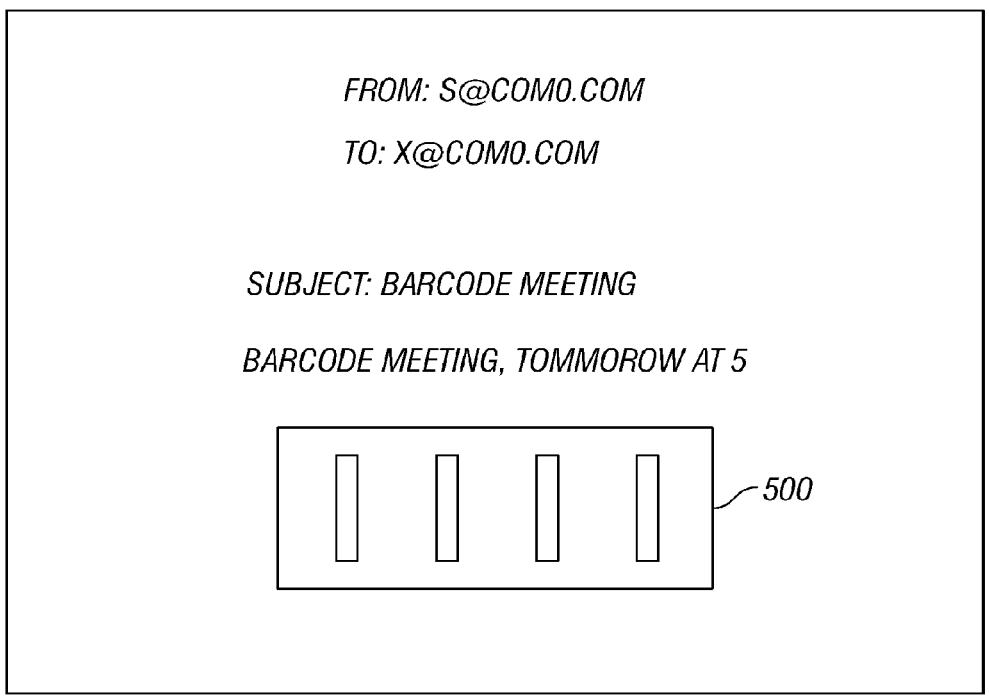
FIG. 5 shows a client-server Internet embodiment.

FIG. 5 shows using this system as part of a communication which is an email. A displayable bar code 500, in image format, e.g. a GIF, JPEG or PDF, is stored as part of the message. This bar code is then displayed in the specified format to a user. The bar code includes the information described above.

Figure 6:
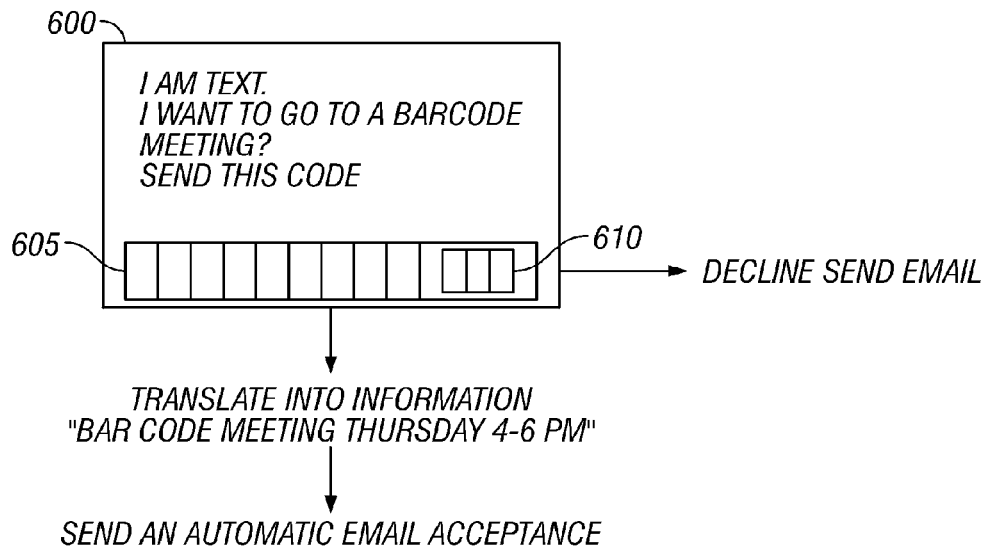
FIG. 6 shows a bar code meeting system.

FIG. 6 shows an alternative display which is presented to a user. The email is displayed with its usual text part 600, which describes text of the message. The text indicates information about something to happen in the future e.g. a meeting. If the user wants to go to the meeting, they are invited to scan the bar code 605. The bar code, once scanned is translated into information for a PDA, e.g. in Palm or Outlook format. The information may say "bar code meeting"; Thursday 4:00-6:00 p.m. This information is then automatically input into the PDA. As above, this text can represent the actual text information, as is shown in FIG. 6. It can represent a compressed form of the actual information, such as compressed using G code. Alternatively, the information can represent a cue address to be used for a look up table during a hot sync or other information transfer, as previously described herein. This information can be printed, and scanned off the printer, or can be scanned directly off the screen. The system shown in FIG. 6 shows scanning the code to input the information.

The communication can also include auxiliary codes 610. A first code can be scanned to send an automatic acceptance or declining by email. The format for the email acceptance can also be included within the code, or can simply be a pre-stored email saying a user name A (filled in by the scanning software) has accepted your meeting B (filled in from the information from the bar code).

Figure 7A:
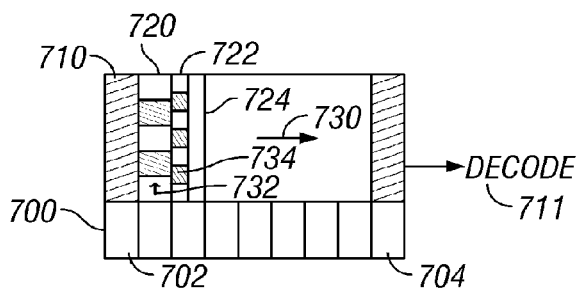
FIGS. 7A-7C show new specialized bar code schemes.
Figure 7B:
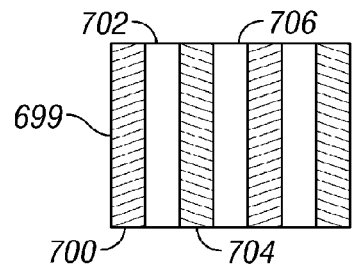
Figure 7C:
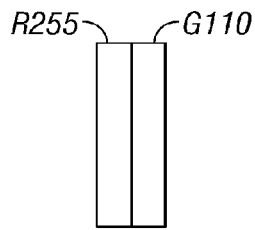

The present system defines using bar codes to enter relatively large amounts of information into the computer. FIGS. 7A through 7C shows special new bar codes which are described according to the present system, which enable this storage of additional information.

Many different kinds of bar codes, that allow storing larger amounts of information, are known. One such bar code is the "Gettysburg Address" type matrix code. This requires, however specialized scanning equipment. This equipment represents a capital investment and has been slow to catch on. The present system teaches, in FIG. 7A, a special bar code which includes increased capacity bar code information, as well as backwards compatibility with previous bar code scanners. The code shown in FIG. 7A includes two parts. A first part 710 is found as legal when scanned for linear codes. A second part 710 registers as invalid/illegal when scanned in this way.

The linear part 700 is a standard and commercially available linear bar code such as a UPC, Type 39 or Type 128 bar code. A conventional linear bar code reader will read and decode this portion. Part of the standard for these bar codes includes certain spacing requirements. For example, dead space at the edges of the bar code may be one of the required characteristics. These are shown as 702, 704. When this dead space is detected, and all other aspects of the bar code are detected, the bar codes can be read and decoded, shown as 711.

The remainder of the bar code may be a code which fails the decoding requirements for the linear bar code 700. This failure type bar code can represent a matrix code, for example, of any desired type. For example, this can be a Gettysburg Address or Vericode type matrix code. In addition, however, it can be a special kind of matrix code in which each bar shown as 720 is itself made up of another bar code extending in the vertical direction. The spacing between the bars 720, 722, 724 may also include information. Within each bar 720, for example, the pattern also provides additional information. In this way, the bar code is actually formed of two different bar code scans. A scan in the direction 730 obtains first information, and a scan across each line in the direction 732 obtains additional information. After scanning the line 732, the system scans along the line 734 to obtain the next item of information. If this is obtained from a camera, however, the whole image can be obtained and later processed using processing techniques to obtain the scan information. In addition, scan information can be obtained from the linear bar code part 700. FIG. 7A shows the linear part taking up approximately twenty-five percent of the area of the entire bar code. However, the two-dimensional scan can take up much less area, e.g. as little as five to ten percent. When scanning with a conventional bar code scanner of the linear type, the bottom portion may be scanned to obtain the two-dimensional bar code information. Enhanced bar code information can be obtained from the additional portion. This enhanced information can be additional information, or it can be the same information as in the first bar code portion, as well as additional information.

In the context of this system, the linear bar code information can represent an address for look up code of the type described above with reference to FIG. 4. The enhanced or non-linear information 710 can represent the total information. A person with a sufficiently advanced bar code scanner can read the entire information. A person with only a linear bar code scanner, however, may scan only the information 700, and then updates the information via a hot sync.

An additional way of using this information, for example for scanning products, is also contemplated. Scan part 700 may include a Universal Product Code or UPC. Scanning part 710 may include additional information about the product, such as a description, or picture. The picture of the product may be displayed to the sales clerk, so that the sales clerk can verify that the product being purchased is actually the product that the user is presenting. Both parts of the bar code may represent information about the product. The part 700 represents basic information and the part 710 represents advanced information.

A second enhanced bar code shown in FIG. 7B is a standard linear bar code or two-dimensional bar code with additional information stored in the gray scale. FIG. 7B show the system configured as a two-dimensional bar code. A first stripe 700 represents a dark (i.e. non-white) stripe. A second stripe 702 represents a white stripe and a third stripe 704 representing another dark stripe. Similarly, the code 699 alternates between white stripes and dark stripes throughout the entire code. In this embodiment, however, the dark stripes 700 are not actually black, but may be a color that is a shade of gray. For example, 16 or 256 different grayscale levels may be defined. Each time a code is detected, its grayscale value is obtained as a numeric value. Similarly, the white stripes 702, 706 may actually be a shade of gray. In this system, rather than simply obtaining spacing information, spacing information and grayscale information are both obtained from the scanning of the code. The gray scale information can be obtained when a camera type imager is used, since the color of the stripes can be obtained in addition to the spacing of the stripes. An alternative is that the white areas 702 are not pure white, but are rather some shade of white which can be characterized between zero and sixteen for example.

Information is obtained from both the shade(s) of gray of the dark portion(s), the white portion(s), and the spacing.

In one embodiment, the sequence of the numbers defining the gray scale levels provides the information. For example, hex value is defined by grayscale values of each gray line. This information is used totally separately from the information that is obtained from the linear barcode information.

Yet another alternative does not use black portions and white portions, but rather uses alternating grayscale portions, with each alternating portion representing a grayscale value. Preferably a system is used whereby the gray scale is itself coded as either the gray scale or the compliment of the gray scale to provide maximum contrast between the bars 700, 702.

An alternative system shown in FIG. 7C uses color bars in the bar code. Not only is the spacing between the bars determined, but also the numerical value representing the bar values themselves. For example, each color can be represented by an eight bit value. That eight bit value is obtained, and used as part of the retrieved information. The eight bit value can represent 2 hex digits. Again, this information can be used as supplemental to the spacing information obtained by the bar code.

In the latter two systems, color is described as being used with a two-dimensional bar code but can also be used with a three-dimensional bar code. In addition, in this system, the color and the spacing can both be used. By taking the available number of digits, and representing the color by that available number of digits, a number in base n, where n can be a very large number, can be obtained. This facilitates storing even more information into a bar code.

These codes preferably follow the paradigm described above, that scanning with a monochrome scanner may return only a part of the information, e.g. an address to be later used for lookup. The color/grey scale information can be used to provide the actual information. For example, the digits represented by the grey scales or colors can be concatenated to form the overall information. Scanning the code gives the bar code information; while looking at the detailed information gives the enhanced information.

Any of these enhanced information codes can be used with the dual information code described above.

Other embodiments are contemplated.

What is claimed is:

1. A barcode reading system comprising:
an electronic communication receiving part receiving a barcode via an electronic communication;
a display screen displaying said barcode to a user on a display screen, wherein said barcode is displayed as an image on said display screen, and where said barcode represents information about an occurrence that will occur in the future, said information including a date and a time; and
wherein said electronic communication receiving part includes a calendar program stored therein storing appointments indicative of calendar events, wherein said electronic communication receiving part automatically inputs from the barcode information from said occurrence that will occur in the future, including said date and time, into said calendar program, responsive to said electronic communication receiving and decoding said barcode.

2. A system as in claim 1, wherein said barcode contains information from which said barcode can be verified.

3. A system as in claim 1, wherein said bar code is a 2 dimensional barcode with information that is indicative of said occurrence.

4. A system as in claim 1, wherein said barcode includes information that can be used to access a remote database of information to determine more information about the information defined by said barcode, and wherein said device sends said information to said remote database, and receives said more information to said electronic communication receiving part.

5. A method comprising: receiving an electronic communication on a user computer, which electronic communication includes an event-defining bar code therein, said event-defining barcode representing information about an event that is to occur at a future time, including a date and a time of said event, wherein said future time is a time subsequent to a time of said receiving;
using said computer for displaying said event-defining bar code on a displaying screen associated with said user computer in a way that allows directly scanning said barcode from said displaying screen; and
using said computer for executing a calendar program stored therein that stores appointments indicative of calendar events, wherein execution of the calendar program automatically inputs from the barcode information about said event at said future time, including said date and time, into said calendar program in response to scanning said barcode from said display screen and decoding said barcode.

6. A method as in claim 5, further comprising scanning said barcode directly from said displaying screen, to obtain said information about said event.

7. A method as in claim 5, wherein said electronic communication is an email.

8. A method as in claim 5, wherein said electronic communication receiving part is a cellular phone.

9. A method as in claim 5, wherein said bar code is a 2 dimensional barcode with information that is indicative of said event.

10. A method as in claim 9, further comprising using information in the barcode to access a database of information to determine more information about the information defined by said barcode, and wherein said database returns said more information to said computer.

11. A method as in claim 5, further comprising using information in the barcode to access a database of information to determine more information about the information defined by said barcode, and wherein said database returns said more information to a device that is carrying out said displaying, and where only said information fetched from said database that is based on said information from said barcode is used as information about said event.

12. A method comprising:
receiving an electronic communication on a user computer, which electronic communication includes an event-defining bar code therein, said event-defining barcode representing information about an event that is to occur at a future time, including a date and a time of said event, wherein said future time is a time subsequent to a time of said receiving;

using said computer for displaying said event-defining bar code on a displaying screen associated with said user computer in a way that allows directly scanning said barcode from said displaying screen;

using said computer for executing a calendar program stored therein that stores appointments indicative of calendar events; and decoding said barcode upon scanning said barcode from said screen and automatically importing at least said date and time of the event from the barcode into said calendar program, and wherein said information uses verification by a verifying source of said what was represented by said barcode, and cannot be used without passing said verifying.

13. A method of using a bar code, comprising:

scanning an electronic image of a bar code representing information indicative of an action from a display screen of a portable device, wherein said action defined by said barcode represents an occurrence, and wherein said barcode further represents a date and time of said action, using information obtained from said scanning said bar code directly from said display screen, to import information indicative of said action, including said date and time, into a computer that is connected to receive said scanning; and using the computer for verifying a source from which the barcode originated, wherein said computer includes a calendar program therein storing appointments indicative of calendar events, and automatically inputting information about said action, including said date and time, into said calendar program, responsive to said scanning.

14. A method as in claim 13, wherein said bar code is a 2 dimensional barcode with information that is indicative of said action.

* * * * *